United States Patent [19]

Horii et al.

[11] Patent Number: 5,172,890
[45] Date of Patent: Dec. 22, 1992

[54] INSTALLATION DEVICE

[75] Inventors: Kiyoshi Horii, 5-8-15-501, Kamimeguro, Meguro-ku, Tokyo, Japan; Kakuji Ohsumi, Yamaguchi, Japan

[73] Assignees: Kiyoshi Horii, Tokyo; Toa Kikai Kogyo Co., Ltd., Shimonoseki, both of Japan

[21] Appl. No.: 745,240

[22] Filed: Aug. 14, 1991

[30] Foreign Application Priority Data

Apr. 10, 1991 [JP] Japan .................................. 3-077909
Jun. 11, 1991 [JP] Japan .................................. 3-139286

[51] Int. Cl.$^5$ .............................................. B66F 3/24
[52] U.S. Cl. ................................................ 254/134.4
[58] Field of Search .................. 254/134.4, 134.3 FT, 254/134.3 R; 15/104.3 SN; 184/15 R; 137/13, 813, 828

[56] References Cited

U.S. PATENT DOCUMENTS

| | | |
|---|---|---|
| 4,691,896 | 9/1987 | Reeve et al. . |
| 4,721,126 | 1/1988 | Horii . |
| 4,796,970 | 1/1989 | Reeve et al. . |
| 4,856,760 | 8/1989 | Frost et al. ....................... 254/134.4 |
| 4,969,481 | 11/1990 | Horii ..................................... 137/13 |
| 5,022,634 | 6/1991 | Keeble ............................. 254/134.4 |
| 5,118,226 | 6/1992 | Horii et al. . |

FOREIGN PATENT DOCUMENTS

| | | |
|---|---|---|
| 0186753 | 7/1986 | European Pat. Off. . |
| 0108590 | 11/1986 | European Pat. Off. . |
| 0347018 | 12/1989 | European Pat. Off. . |
| 63-45508 | 3/1988 | Japan . |
| 63-262339 | 10/1988 | Japan . |
| 2-43505 | 2/1990 | Japan . |

OTHER PUBLICATIONS

"The Rope Passing Method for Repair of Petrochemical Pipelines with Spiral Flow", Horii et al., JPI, vol. 33, No. 5, Sep. 1990, pp. 291-298.
"New Continuous System for Dispersion and Encapsulation of Submicron Powders Using Spiral Flow", Horii et al., The American Societ of Engineers, FED-vol. 100, pp. 25-30.
"A Study of Spiral Flow (Part 5) Analysis of Frictional Force Acting on Short Fiber", Horii et al., Transaction of the Japan Society For Aeronautical and Space Sciences, vol. 32, No. 98, 1990, pp. 176-183.
"A Study of Spiral Flow (Part 3) Opening and Orientation Control of Fiber by Spiral Flow", Horii et al., Transaction of the Japan Societu FPR Aeronautical Transaction and Space Sciences, vol. 32, No. 98, 1990, pp. 155-164.
"A Study of Short Fibert Transportation Using a Spiral Flow", Theoretical and Applied Mechanics, vol. 37, pp.73-79.
"Spiral Flow and Its Industrial Applications—Optical Cord Passing Method", Horii et al., The American Society of Mechanical Engineers, vol. 86, pp. 65-68.

Primary Examiner—Robert C. Watson
Attorney, Agent, or Firm—Wenderoth, Lind & Ponack

[57] ABSTRACT

In a Coanda spiral flow unit installation device, a Coanda flow supply device for the supply of a conducting wire or an induction wire is provided at the suction and induction port through which the conducting wire or the induction wire is induced.

A feeding device is desposed on the outer side thereof.

This device permits more stable installation at high speed and high efficiency. It is possible to install a thin optical fiber over a long distance.

5 Claims, 8 Drawing Sheets

INSTALLATION DEVICE

BACKGROUND OF THE INVENTION

1. Field of the Invention

The present invention relates to a wire or an induction wire installation device, and more specifically to a wire or induction wire installation device which permits easy and highly efficient installation of an optical fiber, cable, etc. even through a thin conducting wire tube having numerous bends and extending longer than 100 m or a thin tube coiled on a drum with an overall length of 1000 m or longer.

2. Prior Art

It has conventionally been a common practice to install a conducting wire or an induction wire through a pipeline or other small-diameter tube in office buildings, factories and communication facilities, and various installation means therefor has been developed. For instance, the installation means known include (a) the ones using compressed gas, such as air, inert gas, inactive gas, etc., and (b) ones using no compressed gas. In the former means using compressed gas, the method of supplying compressed gas through a tube passage and forcing a conducting wire or an induction wire thereinto is known. As an example of the latter means, the method of forcing a conducting wire or an induction wire into a tube passage with polyethylene pipe by hand is known.

However, in the former method, there is a great restriction on the diameter of a tube, and the smaller the tube diameter, the more difficult it is to install a wire therethrough. As the diameter becomes larger, safety problems occur due to the increased pressure of compressed gas. In addition, in the case of installation over a long distance or for a tube with numerous bends and coiled on a drum, it becomes exceedingly difficult to install a wire due to its contact with the inner wall of the tube.

On the other hand, by the method using no compressed gas, a conducting wire is manually forced into a tube, and accordingly such installation of a wire is in many cases difficult. Even when one can manage to install a wire over a short distance, it requires tremendous labor.

During recent years, there have been increasing numbers of cases where an optical fiber is employed as conducting wire. By the conventional installation method, it has been hard to install the fiber smoothly without any damage thereto, and by the method using compressed gas, it has been impossible to install an optical fiber with connection terminals attached thereto. For this reason, operators have been forced to make connections between the ends of optical fibers using a microscope after the completion of the difficult installation operation. Such labor requirements are a great burden on even experienced operators.

The inventor of the present invention has already proposed a new installation means which overcomes the above problems with the conventional installation method, and which permits easy installation of a wire even through a tube having numerous bends and extending as long as 100 m or longer, or a thin tube with an overall length of 1000 m coiled on a drum.

This apparatus operates on the basis of a Coanda spiral air flow to which the inventor of the present invention has been giving aggressive consideration for possible application to various fields of activities.

The Coanda spiral flow has features that differences in velocity and density between the axial flow along which the fluid flows and its surroundings are great, and that it has a steeper velocity distribution, i.e. the degree of turbulence is 0.09, less than half of 0.2 for turbulent flow, forming a different condition from turbulent flow. It also has a feature that a synthesis of an axial vector and a radial vector results in peculiar spiral air flow.

Using the fact that this spiral air flow is a flow which coverages along the tube axis in an in-tube flow, the method has been developed for installing a conducting wire at high efficiency without damage to the wire by use of this spiral air flow that has a small degree of turbulence and can control severe contact with the inner wall of a tube due to the automatic vibration of the wire.

Figure 1:
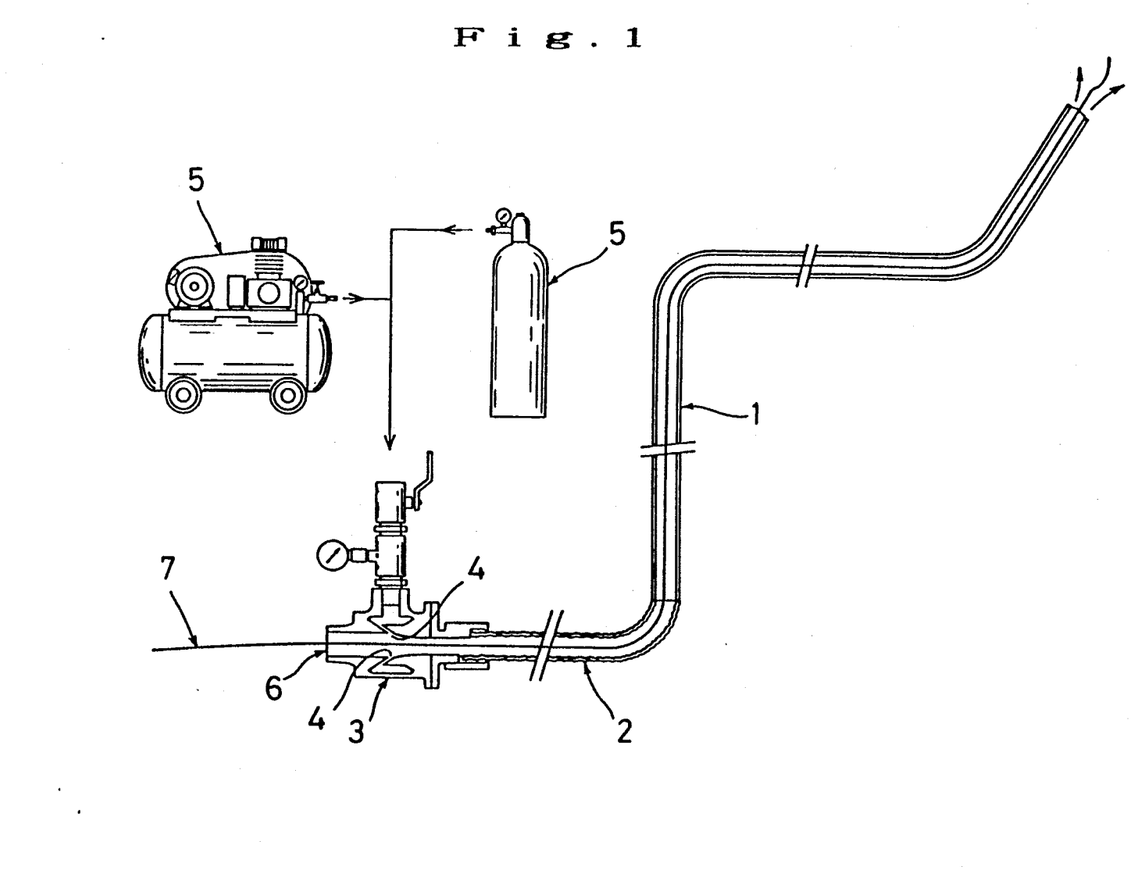
FIG. 1, is a schematic view of an installation method and device therefor which the inventors of the present invention have already proposed.

FIG. 1 is a schematic drawing of the already proposed method and device for spiral air flow installation of a wire.

For instance, as shown in FIG. 1, a Coanda spiral air flow unit 3 is connected through a flexible hose 2 with a specified tube 1 in which a conducting wire is to be installed. To a central flow passage of this Coanda spiral air flow unit 3, compressed gas is supplied in the wire installing direction of the tube 1 through Coanda slits 4 thereof from a compressed gas supply means 5. Under this condition, a specified conducting wire 7 is inserted into the suction and induction port 6 of the Coanda spiral air flow unit 3.

The conducting wire 7 is automatically carried by a spiral air flow in the flexible hose 2 and the tube 1, causing wire installation to proceed at high speed.

As compressed gas supply means 5, a container of air, $N_2$ or other compressed gas, or an air compressor can be utilized. When a container is used, it is acceptable if the container can keep the supply pressure of compressed gas to the Coanda spiral air flow unit 3 at approximately 5 to 20 $Kg/cm^2$.

Figure 2:
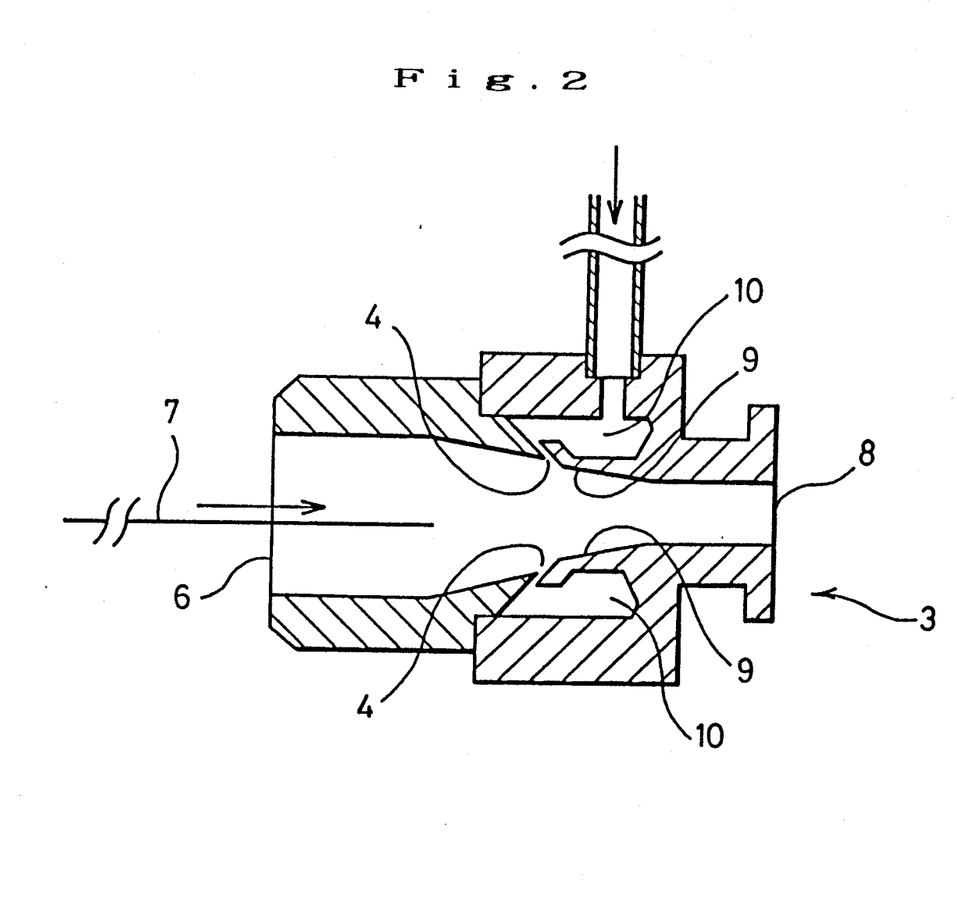
FIG. 2 is a cross-sectional view of the Coanda spiral flow unit for the installation of FIG. 1.

A typical example of the Coanda spiral flow unit 3 is shown in FIG. 2 in which an annular Coanda slit 4, the angled surface 9 in the close vicinity thereof, and a distribution chamber 10 for compressed gas are provided between the connection port to a tube 8 and the suction and induction port 6 through which a conducting wire is introduced.

By making the angle of the angled surface 9 about 5°–70°, a spiral flow occurs and an intense vacuum suction force is generated at the suction and induction port 6, thereby guiding the conducting wire 7 to be installed through the tube 1 at high speed by a Coanda spiral flow.

The foregoing installation method and the device therefor provide excellent effectiveness and permit high-speed wire installation.

However, subsequent studies by the inventors have revealed that improvements can be made in the installation method and device using a Coanda spiral flow. More specifically, in the foregoing installation system, the occurrence of the back flow of compressed gas at the suction and induction port 6 cannot be avoided entirely, and there occurs a vibration and waving of a conducting wire 7. To ensure more stable installation at high speeds and over long distances, these problems must be solved.

SUMMARY OF THE INVENTION

The present invention has been accomplished to overcome the aforementioned problems, and has the object of providing an improved installation device which permits more stable installation of a wire at high speed and over long distances, and which also permits high-speed installation of optical fibers without damage thereto.

In order to achieve the above objects, the present invention provides a Coanda spiral flow unit installation device comprising a tube connection port, an induction port for a wire-like element such as a conducting wire, an induction wire or an optical fiber and a Coanda slit for the supply of compressed gas to generate a Coanda spiral flow in the direction of the tube passage, in which a Coanda spiral flow supply device having a smaller inner diameter for supplying the conducting wire or the induction wire is provided at the induction port for the conducting wire or the induction wire.

DETAILED DESCRIPTION OF THE INVENTION

The present invention provides more stable wire installation at higher efficiency by providing a Coanda flow supply device for the supply of a conducting wire or an induction wire at the suction and induction port 6 of a Coanda spiral flow unit 3 like that shown in FIG. 2 and further by providing a feed device or constructing this unit 3 in multiple stages.

Figure 3:
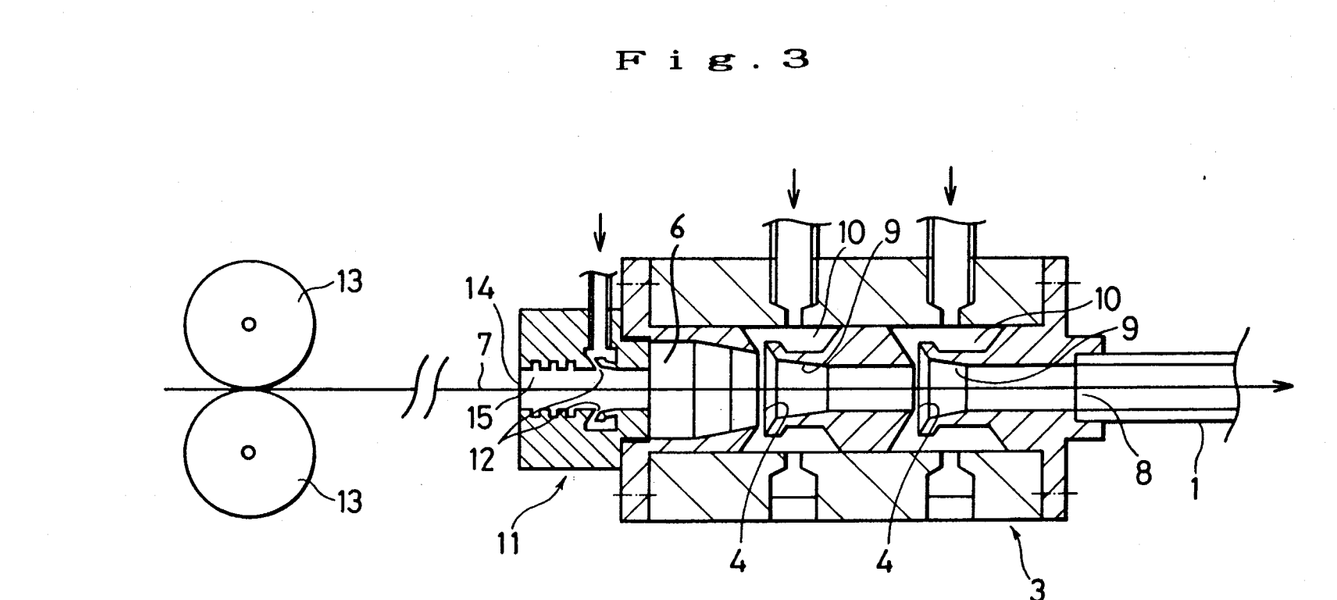
FIG. 3 is a cross-sectional view illustrating a Coanda spiral flow unit for the installation device of the present invention.

FIG. 3 shows an example of the Coanda spiral flow unit for an installation device according to the present invention.

As illustrated in FIG. 3, in the installation device of the present invention, a Coanda spiral flow generating device is provided at the suction and inducation port 6 of the Coanda spiral flow unit 3 and is constituted by a Coanda flow supply device 11 having a smaller inner diameter than the induction port. Compressed air is introduced through a Coanda slit 12 provided in the Coanda flow supply device 11 and supplied to the unit 3 while a conducting wire is fed thereto by a feeding device 13.

As illustrated in this example, in the installation device, a multiple-step Coanda spiral unit can be constructed by connecting the tube passage connecting port 8 of one unit to the suction and induction port 6 of another unit. There is no need to limit the Coanda spiral flow unit to a single unit construction in this invention.

It is preferred that the Coanda flow supple device 11 possesses a smaller diameter than that of the suction and induction port 6 of the Coanda spiral flow unit 3, for controlling the back flow of air and other pressurized gas, and to make the diameter of the induction port 14 slightly smaller than that of a conducting wire 7.

Figure 4:
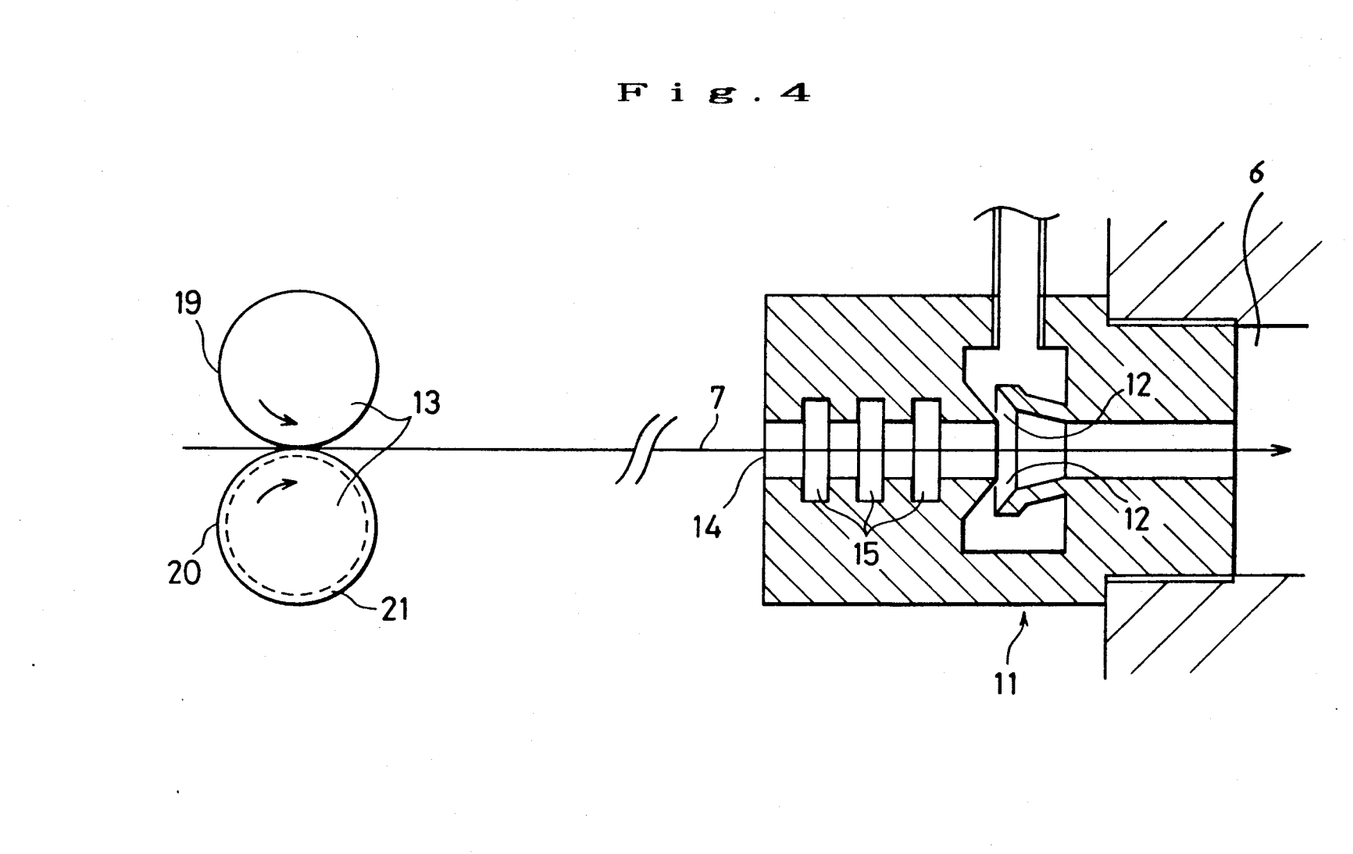
FIG. 4 is a view of a part thereof on an enlarged scale.

Furthermore, as depicted in FIG. 4, which is an enlarged scale view of a small-diameter Coanda flow supply device 11 for the suction and induction of the conducting wire 7, it is further advantageous to provide one or more than two annular grooves 15 at the end of the induction port 14 at a location between the inset end and the annular Coanda slit 12. This groove 15 provides more effective control of the back flow of pressurized gas due to the so-called labyrinth effect.

Figure 5:
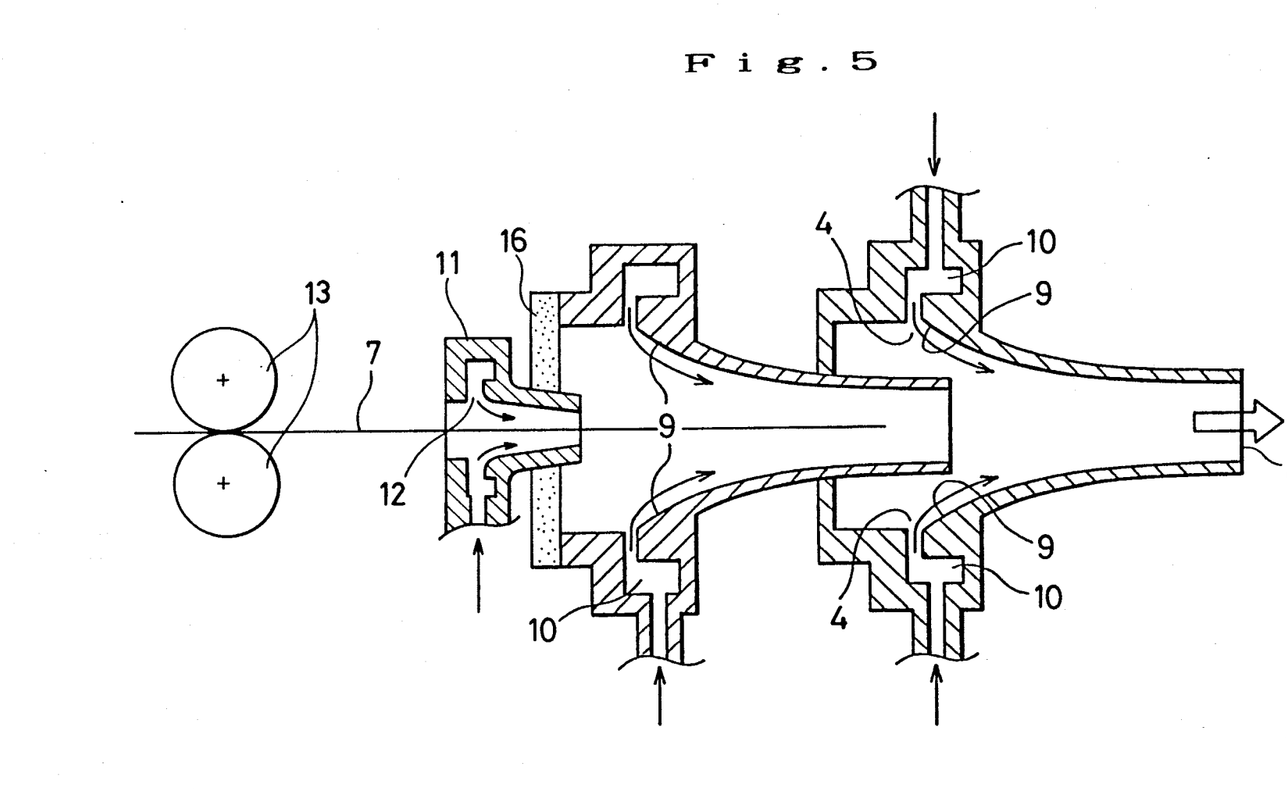
FIGS. 5 and 6 are cross-sectional views of other examples of the Coanda spiral flow unit of the present invention.
Figure 6:
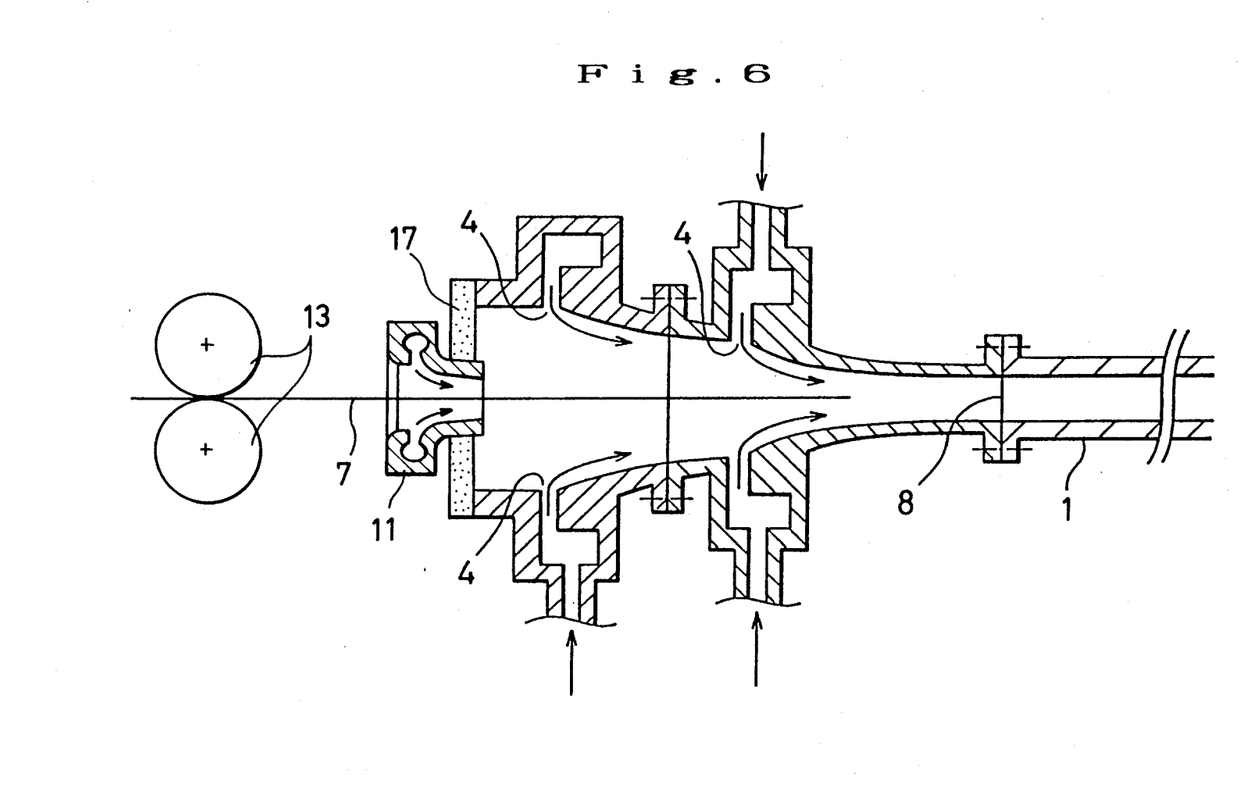

In either case, various configurations and structures may be provided for a multi-stage Coanda spiral flow unit 3, as indicated in FIGS. 5 and 6. The Coanda flow supply device 11 may be supported by a sealing plate made up of a rubber resin rigid elastic plate, or an iron, stainless or other metal plate, or a laminated plate of these materials. A conduction tube may be connected between the Coanda flow supply device 11 and the Coanda spiral flow unit 3. A noise insulation device may be provided at the induction port 14 of the Coanda flow supply device to reduce noises which occur during an installation operation. For the feeding device 13, a pair of rolls which rotate by being driven by a motor can feed a conducting wire 7 while it is being tensioned. In the peripheral surface of one of the two rolls, a groove 21 may be provided. This groove 21 may be formed in an elastic material. Use of such feeding device makes it possible to completely eliminate the vibration and waving of the conducting wire 7. A counter mechanism to indicate the length of the conducting wire 17 installed based on the measurement of the rpm or the rolls may be provided with this feeding device.

In the present invention, to install a conducting wire through a tube 500 m long or more, a split-type Coanda spiral flow unit can be provided halfway along the tube passage as a booster. This booster ensures continuance and stabilization of spiral flow for the wire installation.

A Coanda flow supply device 11 may be a Coanda ring type.

Figure 7A:
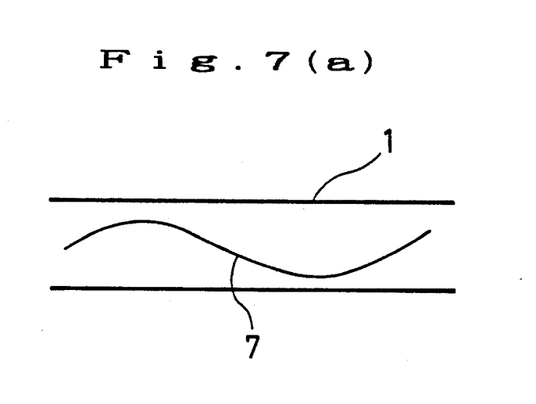
FIGS. 7(a) and 7(b) are schematic drawings of the movement of a conducting wire by the conventional method and by the method according to the present invention.
Figure 7B:
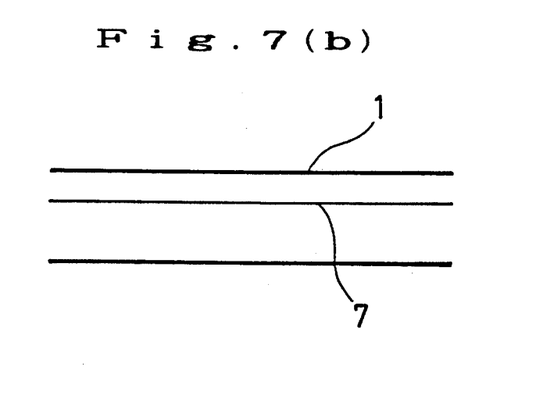

Moreover, in the present invention, it is effective to provide in a tube passage in the vicinity of the Coanda spiral flow unit, a sensor which detects the movement of a conducting wire or an induction wire and to control the feed speed of the feeding device 13 in response to such detection. If there is a vibration of a conducting wire 7 or a waving of the tip, a stable installation is impeded. Accordingly, if any vibration or waving of a conducting wire 7 in a tube passage 1 as illustrated in FIG. 7(a) is detected by the use of an optical fiber, the above provision reduces the feed speed of the feeding device 13 and corrects such vibration or waving so that the status in FIG. 7(b) is attained.

As has been described in detail, the present invention provides the following effect of operation and permits high-speed and stable installation of wires:

a) To completely control the back flow at the Coanda spiral flow unit;

b) To eliminate vibrations of a conducting wire;

c) To remove waving of the wire tip.

EXAMPLE 1

Using a Coanda spiral flow unit 3 which is a two-stage unit as shown in FIG. 3, with the diameters of the connection port 8 and the tube passage 1 at 8 mm and the diameter of the induction port 12 of the Coanda flow supply device 11 at 2.3 mm as shown in detail in FIG. 4, a 1.8 mm diameter optical fiber was installed through a 1000 m-long 6 mm diameter plastic tube (500 m high-density polyethylene tube and 500 m-long low-density polyethylene tube) coiled onto a drum. This optional fiber weighed approximately 2 g/m, and was comprised of a quartz fiber.

The angle of the annular slits was set at 20° and compressed air at a pressure of 8 kg/cm² was introduced through the annular slits. As a result, an installation of the optical fiber through a 1000 m tube was completed in about 50 minutes. There was no back flow, fiber pulsation, or damage to the optical fiber.

Similarly, attempts were made to install an optical fiber by the conventional method of introducing compressed air, but it proved practically impossible to install the fiber.

EXAMPLE 2

Similarly as in Example 1, installing an optical fiber through a 500 m tube was carried out. As a result, such installation was completed in 10 minutes.

It took 30–40 minutes to do the same by the conventional method of introducing compressed air.

EXAMPLE 3

Figure 8:
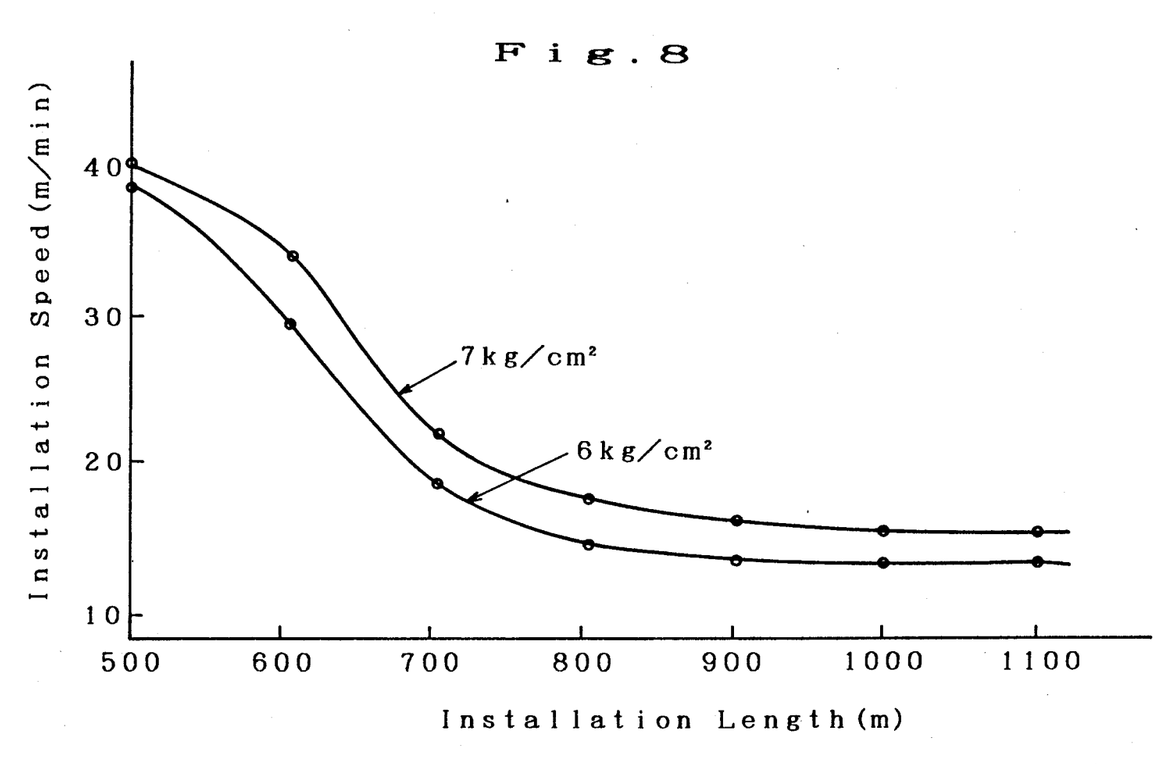
FIG. 8 is a graph of measured data of the feed speed of an optical fiber and the feed distance for an embodiment of the present invention.

Similarly as in Example 1, the feed speed of an optical fiber to a tube with a length of 500 m or longer when the fiber was installed through a 1200 m long tube with a compressed air of 6 kg/cm² and 7 kg/cm² was measured. The results as indicated in FIG. 8 were obtained.

This example shows the achievement of installation at extremely high speeds.

We claim:

1. An apparatus for feeding a wire-like element through a tube, comprising:
   a Coanda spiral flow unit device constituted by at least one Coanda spiral flow unit having a central flow passage, a tube passage connection portion at a downstream end thereof, an induction port at an upstream end thereof, and at least one annular Coanda slit for supplying compressed gas into said central flow passage to generate a Coanda spiral flow in a direction toward said tube passage connection portion; and
   a Coanda flow supply device having a further central flow passage with a smaller inner diameter than said central flow passage and having a downstream end connected to said induction port and a further Coanda slit for supplying compressed gas into said further central flow passage to generate a Coanda spiral flow toward said Coanda spiral flow unit, and having an upstream end through which a wire-like element is supplied to said apparatus for being fed to the tube.

2. An apparatus as claimed in claim 1 in which said upstream end of said Coanda flow supply device has a radially inwardly open groove means around said upstream end forming a labyrinth seal around the wire-like element being fed.

3. An apparatus as claimed in claim 1 further comprising a feeding device for feeding the wire-like element and positioned upstream of said upstream end of said Coanda flow supply device.

4. An apparatus as claimed in claim 3 further comprising a movement detecting sensor for detecting movement of the wire-like element and adapted to be positioned in the tube through which the wire-like element is being fed and connected to said feeding device for adjusting the speed of feed of said feeding device feeding the wire-like element into said Coanda flow supply device in response to movement sensed by said sensor.

5. An apparatus as claimed in claim 1 further comprising a noise insulating means around the downstream end of said Coanda flow supply device and closing the remainder of said upstream end of said Coanda spiral flow unit not occupied by said Coanda flow supply device.

* * * * *